United States Patent
Grimm et al.

[11] Patent Number: 5,601,881
[45] Date of Patent: Feb. 11, 1997

[54] METHOD AND DEVICE FOR COATING A BODY ROTATING ABOUT AN AXIS

[75] Inventors: Wolfgang Grimm; Dirk Brüning, both of Leverkusen; Klaus Recker; Hans-Dieter Ruprecht, both of Köln; Heinz Müller, Leverkusen, all of Germany

[73] Assignee: Bayer Aktiengesellschaft, Leverkusen, Germany

[21] Appl. No.: 436,940

[22] Filed: May 8, 1995

Related U.S. Application Data

[63] Continuation-in-part of Ser. No. 276,724, Jul. 18, 1994, abandoned.

[30] Foreign Application Priority Data

Jul. 30, 1993 [DE] Germany .................. 43 25 653.8

[51] Int. Cl.⁶ .................. B05D 5/00; B29C 53/62
[52] U.S. Cl. .................. 427/425; 427/385.5; 427/388.1; 427/430.1; 156/187; 156/195; 156/244.13; 264/209.2
[58] Field of Search .................. 427/385.5, 388.1, 427/425, 430.1; 156/187, 195, 244.13; 264/209.2; 188/DIG. 11, 77

[56] References Cited

U.S. PATENT DOCUMENTS

| | | | |
|---|---|---|---|
| 4,259,137 | 3/1981 | Kemmerling | 156/350 |
| 4,366,972 | 1/1983 | Franklin | 285/55 |
| 4,459,168 | 7/1984 | Anselm | 156/143 |
| 4,466,854 | 8/1984 | Hawerkamp | 156/429 |
| 5,290,632 | 3/1994 | Jadhav et al. | 428/423.1 |

FOREIGN PATENT DOCUMENTS

| | | |
|---|---|---|
| 945019 | 4/1971 | Canada . |
| 523509 | 1/1993 | European Pat. Off. . |

OTHER PUBLICATIONS

Modern Plastics International, vol. 23, No. 7, Jul. 1993, Lausanne Ch, pp. 20–22, Peter Mapelston, "Turnkey coating system covers pressure gas pipe".
Patent Abstracts of Japan, vol. 12, No. 155 (C–494) May 12, 1988, & JP–A–62 266 175 (Konoshirouku Photo Ind.).
Patent Abstracts of Japan, vol. 9, No. 323 (P–414) Dec. 18, 1985 & JP–A–60 150 053 (Konishiroku) Aug. 7, 1985.

*Primary Examiner*—Shrive Beck
*Assistant Examiner*—David M. Maiorana
*Attorney, Agent, or Firm*—Joseph C. Gil

[57] ABSTRACT

The coating of bodies rotating about an axis with a reaction mixture forming a polyurethane can be improved by making use of a sheet die disposed parallel to the axis of rotation of the body at an angle α, whereby the rate of reaction of the reaction mixture and the relative movement are synchronized with the circumferential speed of the rotating body in such a way that the successive convolutions overlap in the form of scales and connect together seamlessly.

3 Claims, 2 Drawing Sheets

5,601,881

METHOD AND DEVICE FOR COATING A BODY ROTATING ABOUT AN AXIS

CROSS REFERENCE TO RELATED APPLICATION

This application is a continuation-in-part of U.S. application Ser. No. 08/276,724, filed on Jul. 18, 1994, now abandoned.

BACKGROUND OF THE INVENTION

The present invention relates to a method and a device for coating a body rotating about an axis, whereby a relative movement takes place in the direction of the axis of rotation between the body and a nozzle which ejects a reaction mixture forming a polyurethane, so that application is effected in helical convolutions.

The coating of rotating bodies according to this method is generally known. The method can be used for the production of hollow bodies, in particular of pipes, by the coating of a removable core or mandrel. Difficulties arise depending on parameters such as circumferential speed and rate of feed of the body or the nozzle. In particular there is a risk of air blisters and inadequate contact of individual convolutions. Hence attempts have already been made in the production of pipes by the coating of a core to apply the reaction mixture to a carrier tape and to wind the latter about a core, whereby the gap that is present between the individual convolutions is filled up with reaction mixture (see, e.g., European Patent 523,509). Due to this additional filling of the gap, the expenditure on process technology and machinery is considerable. In addition, this method is not suitable for the coating of bodies, since it is not possible to dispense with the carrier tape.

The object of the present invention was to improve the method in such a way that flawless coatings can be produced economically.

DESCRIPTION OF THE INVENTION

Figure 1:
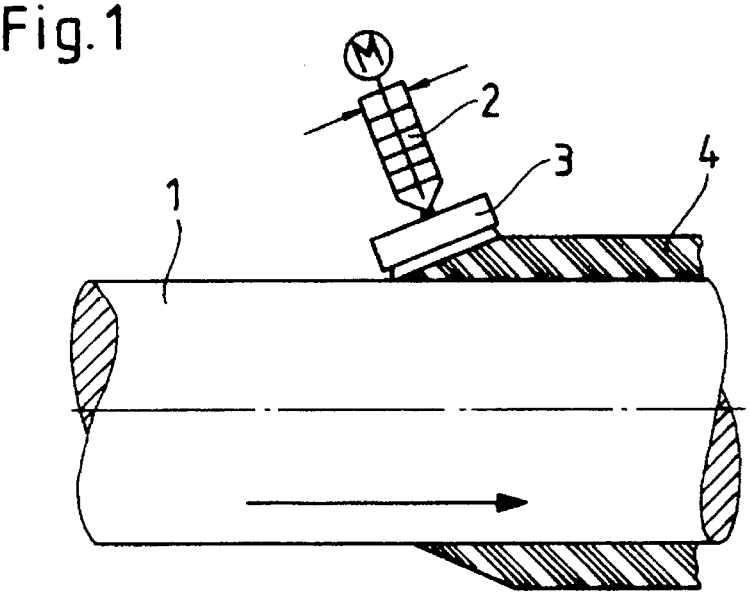
FIG. 1 is a longitudinal view of a device for external coating of pipes.

The above object is achieved by making use of a sheet die disposed parallel to the axis of rotation at an angle α, whereby the relative movement and the rate of reaction of the reaction mixture are synchronized with the circumferential speed of the rotating body in such a way that the successive convolutions overlap in the form of scales and connect together seamlessly. A sheet die herein means a die with an outlet in the form of a slit so that the reaction mixture is expelled in the form of a sheet-like stream. The slit may have a length to width ratio of 10 to 300, preferably 100 to 250.

More particularly, the present invention is directed to a method for coating a body comprising:

i) rotating the body about an axis, ii) ejecting a polyurethane reaction mixture through a sheet die onto the rotating body, with the sheet die being disposed at an angle α to the axis of rotation, iii) effecting relative movement between the rotating body and the sheet die in a direction parallel to axis of rotation, and iv) synchronizing the rate of reaction of the reaction mixture and the relative movement with the circumferential speed of the rotating body in such a way that successive convolutions overlap in the form of scales and connect together seamlessly.

The new method is particularly suitable for coating rollers (such as are used in the steel, materials-handling, transport and paper industries) with a polyurethane elastomer. In addition, pipes with an external coating can be produced according to the present method for the industrial and offshore sectors, as well as pipes with an internal coating for the hydraulic conveying of abrasive goods. Where necessary, the surfaces to be coated can be provided beforehand with an adhesion promoter.

Pipes or other hollow bodies can also be manufactured in accordance with the new method by coating a removable core. In this case, either a release agent is applied to the core or the core must be surrounded with a release foil. Finally, the new method can also be used for providing pipes with a heat-insulation jacket consisting of rigid polyurethane foam. In comparison with the known methods, the convolutions are applied not so as to lie side by side but so as to overlap. In fact, in using the present invention, formation of air blisters and lack of adhesion between individual convolutions would have been expected. It is all the more surprising that there is no evidence of air blisters and that the convolutions merge together with one another without forming a crust or seam and form a sufficiently smooth coating surface. The new method is not only suitable for internal and external coating of axially symmetrical bodies but can also be used to coat bodies which exhibit variable diameters across the length and/or cross-section. The method can be implemented by computer control. In the case of irregularly shaped bodies it is necessary to guide the sheet die so that it is always at the same distance from, and at the same inclination to, the surface of the body to be coated. Due to the width of the sheet die, there are limits as regards the uneven geometry of bodies. It is also possible to achieve variable coating thicknesses by changing the angle α at desired places.

An important parameter of the method is the viscosity of the reaction mixture when it is discharged from the sheet die. In order to obtain the desired coating thickness, it is frequently necessary to change the geometry of the slit of the sheet die. For this reason it may be necessary to exchange the sheet die for one of different geometry or to design the height of the slit and the width of the slit to be adjustable.

It is particularly advantageous to make use of sheet dies which ensure that the discharge speed of the mixture from the slit of the sheet die is the same everywhere and that the mixture which emerges is of the same age at each point of the slit.

In general, in the case of low viscosities, the height of the slit can be smaller, whereas at higher viscosities, it has to be larger. In this way the pressure gradient in the sheet die can be kept relatively low, so that when the reaction components are dosed there is no need for high-pressure mixing heads, and so, as a rule, the less expensive low-pressure mixing heads satisfy the requirements. Of course, high pressure mixing heads can also be used since they have the advantage over low-pressure mixing heads of being self-cleaning by means of a discharge piston.

The overlapping convolutions combine both physically and, at least in part, chemically. In the case of external coatings, the shrinkage stress causes a contraction and acts to counter the thermal expansion brought about by the exothermic nature of the reaction. As a result, shear stresses arise in such a way that neither a crust nor a seam is formed.

The method is suitable for coating or producing bodies having the most varied diameter. In the case of large diameters, use is made of systems which react more slowly than those for smaller diameters. For the internal coating of bodies the exothermic reaction should be adjusted so that excessive contraction stresses do not arise—i.e., products should used which have been pre-reacted to as high a degree as possible. In other words, isocyanate prepolymers should be used.

With the new method, it is also possible to process systems which contain fillers, preferably in the form of glass microspheres, hollow glass microspheres and glass fibers up to about 6 mm in length. Coarse-meshed fabric tapes, glass-fiber rovings, wires and the like can also be worked into the coating.

The angle $\alpha$ is preferably adapted to the angle of the shoulder that is formed during coating. This means that, since the angle of the shoulder can be calculated or determined empirically, it is known beforehand. The angle is set at the same angle at which the sheet die is set with respect to the surface to be coated. In this way, apart from the period from start-up until the desired thickness has been obtained, a uniform distance of the slit of the sheet die from the point of application is achieved. This distance suitably amounts to 1 to 10 mm. Preferably, the angle $\alpha$ is between 5° and 40°, particularly preferred is an angle of below 25°.

According to a particularly advantageous way of implementing the new method, the sheet die is aligned in a plane parallel to the axis of rotation so that the film coating when discharged from the slit is deflected in accordance with the winding angle. With this measure, a high quality coating can be achieved which is free from air blisters.

In this connection the sheet die is suitably disposed, in the case of external coating, in the upper quarter rotating upwards and, in the case of internal coating, in the lower quarter rotating upwards. This particularly promotes the interconnection of the convolutions.

The circumferential speed at the largest diameter of the coating to be applied is preferably adjusted to be less than the speed at which the reaction mixture emerges from the sheet die. By using of this measure, the formation of blisters at the edges of the applied coating is avoided.

Reaction mixtures are preferably processed with a pouring-time of 0.3 seconds to 10 minutes. Reaction mixtures with this pouring-time can be processed particularly well, and in connection with the other process parameters, they ensure a coating which has a sufficiently smooth surface. This means that the individual, scale-like overlapped convolutions combine and merge together with one another in such a way as to form a homogeneous coating.

At the start of the application operation, the coating thickness first has to build up. With roller coatings, a coating width is therefore always required which protrudes beyond the subsequent useful width of the coating to such an extent that the regions of increasing and decreasing coating thickness lie outside this useful width.

The invention is also directed to a device for carrying out the process. The new device for coating a body rotating about an axis with a reaction mixture forming a polyurethane requires a bearing and a rotary drive for the body as well as a sheet die, whereby either the sheet die is provided with a feed drive acting parallel to the axis of rotation of the body or a feed drive acting in the direction parallel to the axis of rotation is assigned to the body.

The novel aspect consists in that the sheet die together with the surface of the body to be coated encloses an acute angle $\alpha$ opening out in a direction opposite to the direction in which the coating is applied. This results in the advantageous effects described in connection with the new method.

Reference will now be made to the drawings which show an embodiment for external coating of pipes and an embodiment for internal coating of pipes.

Figure 2:
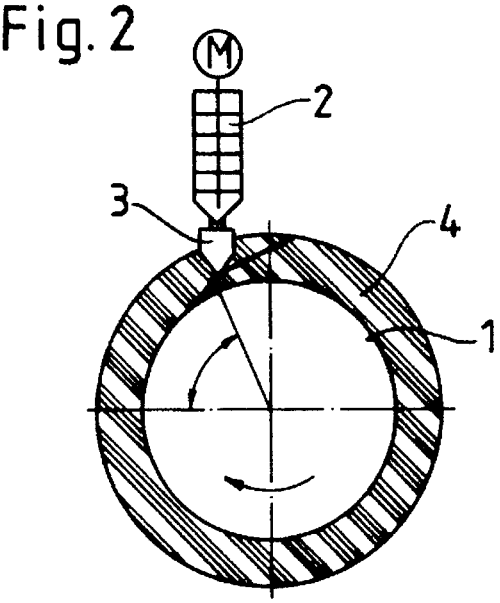
FIG. 2 is a front view of the device of FIG. 1.

In FIGS. 1 and 2, a pipe 1 is mounted in a rotary device which is not illustrated. In the direction of the longitudinal axis of the pipe 1, a mixing head 2 with a sheet die 3 is arranged so as to be displaceable lengthwise. Feeding is effected at a constant rate. The sheet die is aligned in the longitudinal direction of the pipe and together with the outer wall of the pipe forms an angle $\alpha$ of 15°. It is arranged above the quarter of the pipe 1 rotating upwards at an angle $\beta$ of 85° before the zenith. The layer of mixture applied is designated as 4.

Figure 3:
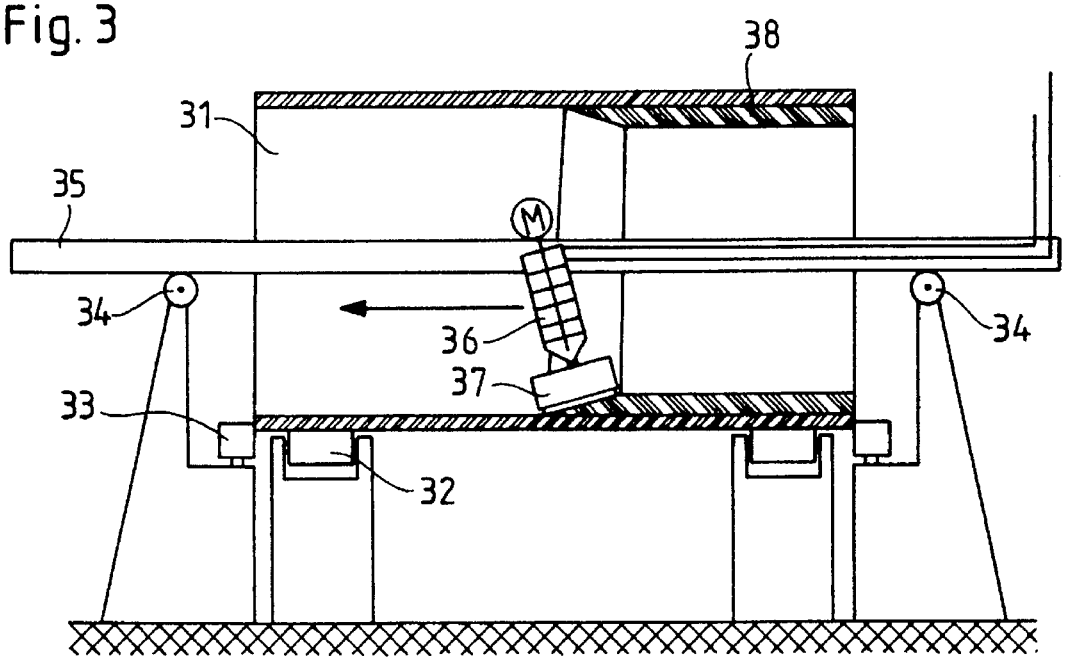
FIG. 3 is a longitudinal view of a device for internal coating of pipes.
Figure 4:
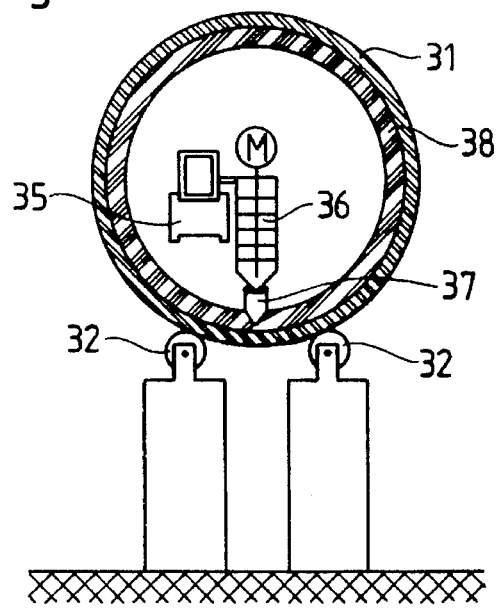
FIG. 4 is a front view of the device of FIG. 3.

In FIGS. 3 and 4, a pipe 31 is mounted on rollers 32 and is set in rotation by rollers 33. A jib 35 mounted on driven rollers 34 is pushed by the pipe 31, whereby there is attached to said jib a mixing head 36 with a sheet die 37. The sheet die 37 is aligned on the lowest part of the pipe 31 in the longitudinal direction of the pipe, and together with the inner wall of the pipe form an angle $\alpha$ of 8°. The layer of mixture applied is designated as 38.

The arrows in FIGS. 1 and 3 show which of the two elements (i.e., the die or the body to be coated) is moved to establish relative movement between the two elements in a direction parallel to the longitudinal axis of the body to be coated. In other words, in FIG. 1, the arrow represents the direction of movement of the pipe 1. The reaction mixture 4 is necessarily applied in the opposite direction. In contrast, in FIG. 3, the arrow represents the direction of movement of the die 37. The reaction mixture is necessarily applied in the same direction.

The invention is further illustrated but is not intended to be limited by the following examples in which all parts and percentages are by weight unless otherwise specified.

EXAMPLES

Example 1

A steel roller with a core diameter of 240 mm is sandblasted and then coated with about 75 g/m$^2$ of a two-component adhesion promoter by rolling. The path length of the roller amounts to 1400 mm.

A polyurethane elastomer layer with a thickness of 23 mm is applied by application of a reaction mixture corresponding to the formulation given below by means of a 125 mm ×0.6 mm sheet die. The sheet die is clamped in such a way parallel to the roller in its longitudinal direction and inclined to the vertical by 15° that the lower edge is suspended about 5 mm above the surface of the roller. The point of impact of the reaction mixture is located at about 85° in relation to the horizontal axis of the roller. The rotary speed amounts to 13 min$^{-1}$, the feed 208 mm/min and the total output 4270 g/min.

The reaction mixture was made from two components. Component A consisted of a mixture of 85 parts by weight of a 35 OH number polyether consisting of trimethylpropane, propylene oxide (85% by weight) and ethylene oxide (15% by weight), 15 parts by weight diethyltoluene diamine (isomeric mixture), and 0.05 parts by weight diazabicyclooctane. Component A had a viscosity at 25° C. of 1050 mPa·s.

Component B consisted of the reaction product of 100 parts by weight of a 56 OH number polyether consisting of 1,2-propylene glycol and propylene oxide, 79 parts by weight of diphenylmethane diisocyanate (70% by weight 4,4'-MDI and 30% by weight 2,4'-MDI). The reaction product had an NCO content of 12.2% by weight and a viscosity at 25° C. of 1600 mPa·s.

Mixing ratio:
100 parts by weight of Component A
84 parts by weight of Component B
Pot life: 5 seconds
Properties of the elastomer:

| Hardness (Shore A) | 90 |
| Tensile strength (MPa) | 20 |
| Elongation at tear | 450 |

Example 2

A steel roller with a core diameter of 260 mm is provided with a coating with a thickness of 22 mm. The rotary speed of the roller is about 28 min' and the feed of the sheet die is about 182 mm/min. The angle of incidence $\alpha$ of the sheet die was set at 17°.

The reaction mixture was made from three components. Component A consisted of 100 parts by weight of a prepolymer having an NCO content of 9.8% by weight (prepared from 4,4'-diphenylmethane diisocyanate and a 2000 molecular weight polyether carbonate). Component B consisted of 19.5 parts by weight of a diamine 3,5-bis-thiomethyltoluene diamine (predominantly 2,4-diamino compound) Component C consisted of 5 parts by weight of a mixture consisting of 1.5 parts by weight diethyltoluene diamine (with an NH-number of 630) and 3.5 parts by weight of a 2000 molecular weight polyether carbonate.

In this process, Component A was dosed at a temperature of 90° C. with an output of 3000 g/min, Component B at a temperature of 25° C. with an output of 585 g/min, and Component C at a temperature of 50° C. and with an output of 150 g/min.

Example 3

This example was undertaken in order to provide a steel pipe having a nominal width of 360 mm and a length of 5000 mm with a wear-protection inner coating having a thickness of 15 mm. The same formulation was used as in Example 1.

Onto the freshly sand-blasted surface, an adhesion promoter was applied in a quantity of 80 g/m² by spraying and/or rolling. After the prescribed air drying-time of one hour, a mechanically-operated mixing head [which is attached to a support and equipped with a sheet die (100×0.6 mm) arranged parallel to the pipe] is inclined at an angle of 10° and drawn through the pipe in the horizontal direction with a clearance from the lower edge of 5 mm, measured from the inner surface of the pipe, at a rate of feed of 300 mm/min. The pipe is clamped into a rotating device and is rotated at a rotary speed of 36 min$^{-1}$. In the mixing chamber of the mixing head there are dosed Component A with an output of 2860 g/min and Component B with an output of 2400 g/min and these are mixed continuously by stirring. The coating operation is discontinued after 17 minutes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for coating a body comprising:
   i) rotating the body about an axis,
   ii) ejecting a polyurethane reaction mixture through a sheet die onto said rotating body, with said sheet die being disposed at an angle $\alpha$ to said axis, and wherein the sheet die is maintained at a uniform distance of from 1 to 10 mm above the point at which said reaction mixture is applied to said rotating body,
   iii) effecting relative movement between said rotating body and said sheet die in a direction parallel to said axis,
   iv) synchronizing the rate of reaction of said reaction mixture and said relative movement with the circumferential speed of said rotating body in such a way that successive convolutions overlap in the form of scales and connect together seamlessly, and
   v) wherein said circumferential speed is less than the speed at which said reaction mixture emerges from said sheet die.

2. The method of claim 1, wherein the angle $\alpha$ is adapted to the angle of a shoulder which is formed in the course of coating.

3. The method of claim 1, wherein said reaction mixture has a pouring-time of from 0.3 seconds to 10 minutes.

* * * * *